(12) United States Patent
Raag et al.

(10) Patent No.: US 10,930,015 B2
(45) Date of Patent: Feb. 23, 2021

(54) METHOD AND SYSTEM FOR CALIBRATING MULTIPLE CAMERAS

(71) Applicant: STARSHIP TECHNOLOGIES OÜ, Tallinn (EE)

(72) Inventors: Rasmus Raag, Tallinn (EE); Indrek Mandre, Tallinn (EE)

(73) Assignee: STARSHIP TECHNOLOGIES OÜ, Tallinn (EE)

(*) Notice: Subject to any disclaimer, the term of this patent is extended or adjusted under 35 U.S.C. 154(b) by 81 days.

(21) Appl. No.: 16/287,355

(22) Filed: Feb. 27, 2019

(65) Prior Publication Data

US 2019/0295291 A1    Sep. 26, 2019

Related U.S. Application Data

(63) Continuation of application No. PCT/EP2017/072505, filed on Sep. 7, 2017.

(30) Foreign Application Priority Data

Sep. 7, 2016  (EP) ..................................... 16187719

(51) Int. Cl.
*G06T 7/80* (2017.01)
*G06T 7/13* (2017.01)
(Continued)

(52) U.S. Cl.
CPC ................ *G06T 7/85* (2017.01); *G06F 17/18* (2013.01); *G06T 7/13* (2017.01); *G06T 7/70* (2017.01);
(Continued)

(58) Field of Classification Search
CPC .......... G06F 17/18; G06T 2207/10024; G06T 2207/30208; G06T 2207/30244;
(Continued)

(56) References Cited

U.S. PATENT DOCUMENTS

2003/0202691 A1* 10/2003 Beardsley ................. G06T 7/85
382/154
2011/0085738 A1* 4/2011 Kitamura ................ G06T 5/002
382/199

(Continued)

FOREIGN PATENT DOCUMENTS

GB         2465793 A      6/2010

OTHER PUBLICATIONS

Zhang, Zhengyou: "Camera Calibration", in G. Medioni & S.B. Kang, eds., Emerging Topics in Computer Vision, Prentice Hall, Dec. 2004.
(Continued)

*Primary Examiner* — Amy R Hsu
(74) *Attorney, Agent, or Firm* — Siritzky Law, PLLC

(57) ABSTRACT

The invention relates to a method for calibrating cameras. In particular, the invention provides a method that estimates the position of interest points such as corners on images of array patterns, and uses such refined positions in an iterative calibration algorithm. The method can be extended to simultaneously process information from a large number of images from a plurality of cameras that are arranged in a fixed position on a mobile robot, wherein the images are representative of different camera poses. The optimization thereby provides a highly accurate estimate of camera calibration parameters.

20 Claims, 6 Drawing Sheets

(51) Int. Cl.
*G06T 7/70* (2017.01)
*H04N 13/246* (2018.01)
*G06F 17/18* (2006.01)

(52) U.S. Cl.
CPC .............. *G06T 7/80* (2017.01); *H04N 13/246* (2018.05); *G06T 2207/10024* (2013.01); *G06T 2207/30208* (2013.01); *G06T 2207/30244* (2013.01)

(58) Field of Classification Search
CPC .... G06T 7/13; G06T 7/70; G06T 7/80; G06T 7/85; H04N 13/246
See application file for complete search history.

(56) References Cited

U.S. PATENT DOCUMENTS

| | | | | |
|---|---|---|---|---|
| 2012/0072080 | A1* | 3/2012 | Jeromin | G06K 9/2018 701/49 |
| 2013/0010081 | A1* | 1/2013 | Tenney | G06T 7/80 348/47 |
| 2014/0107960 | A1* | 4/2014 | Oritz Egea | A61B 5/0066 702/104 |
| 2015/0288951 | A1* | 10/2015 | Mallet | H04N 17/002 348/46 |
| 2015/0317781 | A1* | 11/2015 | Napier | G01S 17/86 348/46 |
| 2016/0086338 | A1* | 3/2016 | Nagamatsu | G06T 7/80 348/78 |
| 2016/0343136 | A1* | 11/2016 | Heidi | G06T 7/80 |
| 2019/0236796 | A1* | 8/2019 | Blasco Claret | G06T 5/002 |

OTHER PUBLICATIONS

Harris, C., Stephens, M.: A combined corner and edge detector. In: Proceedings of 4th Alvey Vision Conference, pp. 147-151 (1988).
Moravec, Hans P. "Obstacle Avoidance and Navigation in the Real World by a Seeing Robot Rover", Sep. 1980, CMU-RI-TR3, Carnegie-Mellon University.
Shi, J. et al. "Good Features to Track", in 9th IEEE Conference on Computer Vision and Pattern Recognition (CVPR94), Seattle, Jun. 1994.
Förstner, W. et al, "A Fast Operator for Detection and Precise Location of Distinct Points, Corners and Centres of Circular Features" in ISPRS Intercommission Workshop, Interlaken, Jun. 1987, pp. 149-155.
Wang, H. et al: "Real-time corner detection algorithm for motion estimation", (Image and Vision Computing, Nov. 1995), 13:9:695-705).
Smith & Brady, "SUSAN—A New Approach to Low Level Image Processing", Int J Computer Vision (May 1997), 23:45-78.
Trajkovic, M. et al: "Fast Corner Detection" (Image and Vision Computing (Feb. 1998), 16:2:75-87).
Abhishek Nagar et al: "Smartphone based Color Grid Detection and Tracking", Jun. 9, 2016.
Jean-Yves Bouguet: „Camera Calibration Toolbox for Matlab, Apr. 26, 2012, pp. 1-29, retrieved from Internet URL: http://web.archive.org/web/20120426134652/http://www.vision.caltech.edu/bouguetj/calib_doc/htmls/example.html.
WIPO, International Search Report in PCT/EP2017/072505, dated Mar. 15, 2018 (4 pgs.).
WIPO, Written Opinion of the International Searching Authority, in PCT/EP2017/072505, dated Mar. 15, 2018 (15 pgs.).

* cited by examiner

| color 1 | color 2 | color 1 | color 3 | color 1 | color 4 |
|---------|---------|---------|---------|---------|---------|
| color 2 | color 1 | color 3 | color 1 | color 4 | color 1 |
| color 1 | color 2 | color 1 | color 3 | color 1 | color 4 |
| color 3 | color 1 | color 4 | color 1 | color 5 | color 1 |
| color 1 | color 2 | color 1 | color 3 | color 1 | color 4 |

FIG. 2

METHOD AND SYSTEM FOR CALIBRATING MULTIPLE CAMERAS

RELATED APPLICATIONS

This application is a continuation of PCT/EP2017/072505, filed Sep. 7, 2017, titled "Method and system for calibrating multiple cameras," the entire contents of which are hereby fully incorporated herein by reference for all purposes. Application PCT/EP2017/072505 claims priority to European application EP16187719.6, filed Sep. 7, 2016, the entire contents of which are hereby fully incorporated herein by reference for all purposes.

FIELD

The invention relates to a method for calibration of cameras, in particular cameras that are positioned on a mobile robot.

INTRODUCTION

Camera calibration is a necessary step in computer-based vision, since cameras produce 2D images from observations in real-world 3D space. The calibration estimates parameters of a lens and image sensor of an image or video camera.

The calibration involves estimating intrinsic and extrinsic parameters of the camera. Intrinsic calibration refers to metrics of the camera itself, which describe the projection from 3D camera coordinates to 2D image coordinates (pixel coordinates) and the way a real lens system distorts those coordinates, compared to an ideal lens. The calibration includes parameters such as focal length and principal point of the pinhole camera model, and parameters of a lens distortion model. Extrinsic calibration on the other hand is done to determine the position and orientation of cameras in 3D world coordinates. In other words, the extrinsic parameters determine the position and orientation (pose) of the camera in some coordinate system. When multiple cameras are calibrated simultaneously, extrinsic calibration can also determine the relative position of the cameras.

A number of approaches are known for calibrating cameras, including methods that rely on 3D reference objects, methods that rely on the observation of a planar pattern at one or more orientations, line-based approaches and self-calibration approaches that do not use a reference point but rather are based on a moving the camera within a static scene. Some of these approaches are summarized by Zhang ("Camera Calibration", in G. Medioni & S. B. Kang, eds., Emerging Topics in Computer Vision, Prentice Hall 2004).

In practice, it is common to capture multiple images of a particular pattern, for example a checkerboard pattern, and determine the correspondence between 3D world coordinates and camera 2D coordinates. Following calibration, the accuracy of determined parameters can be determined by comparing relative position of the camera and calibration pattern, by calculating reprojection errors and/or by estimating parameter estimation errors.

SUMMARY

The present invention is specified in the claims as well as in the below description. Preferred embodiments are particularly specified in the dependent claims and in the description of various embodiments.

The invention provides a method for calibrating at least one camera. The method comprises steps of (a) capturing at least one image of at least one array pattern, said image comprising a plurality of interest points and a plurality of edges, with at least one camera for at least one pose of each at least one camera; (b) processing said at least one image to determine a provisional location of at least one interest point on the at least one image; (c) refining the provisional position of said at least one interest point on the at least one image; and (d) optimizing camera calibration parameters based on the refined position of the at least one interest point on the at least one image.

The invention also provides a method for calibrating at least one camera comprising steps of (a) capturing at least one image of at least one array pattern with at least one camera for at least one pose of the at least one camera, wherein the image comprises a plurality of interest points; (b) processing said at least one image to determine a provisional location of at least one interest point on the at least one image; (c) refining the provisional position of said at least one interest point on the at least one image; and (d) optimizing camera calibration parameters based on the refined position of the at least one interest point on the at least one image.

The refining of the provisional location of the interest point can be achieved by (i) selecting a partial area of the image that includes at least one interest point and at least a portion of at least two edges that meet at or near the interest point; (ii) defining at least a first and second set of edge points representative of said at least two intersecting edges; (iii) applying regression analysis to the first and second sets of edge points, respectively; and (iv) determining a refined position of the at least one interest point as the intersection of regression functions representative of the first and second sets of edge points.

Also provided and disclosed herein is a method of calibration of at least one camera, comprising: (a) providing a mobile robot comprising a plurality of cameras that are fixedly mounted thereon; (b) providing at least two geometrically fixed array patterns, each pattern comprising a plurality of interest points; (c) capturing a plurality of images of at least a portion of said array patterns using said plurality of cameras for a plurality of poses of the mobile robot; (d) determining the position of a plurality of interest points within each of the array patterns for images captured in step (c), so as to generate a grid of interest points within each array pattern for different poses of the mobile robot; and (e) process information from the images obtained in step d) so as to simultaneously optimize at least (i) the position of the cameras; (ii) the optical center of each of the cameras; and (iii) the focal length of each of the cameras.

Preferably, the optimizing comprises estimating parameter values that describe at least one of: camera poses during the capturing of images; poses of the array patterns; poses of the plurality of cameras; and camera properties for each of the plurality of cameras, preferably at least optical center, focal length and distortion parameters of each of the cameras.

The invention also provides a method for detecting corners on an image. The image can preferably be an image of an array pattern. The array pattern can be a pattern that contains identifiable corners that are regularly spaced within the pattern. The method comprises steps of (a) capturing at least one image of an array pattern comprising a plurality of interest points with at least one camera; (b) processing said at least one camera image to determine a provisional location of at least one interest point on the at least one image; and (c) refining the provisional position of said at least one interest point on the at least one image. The refining is preferably done by (i) selecting a partial area of the image that includes at least one interest point and at least a portion of at least two edges that meet at or near the interest point; (ii) defining at least a first and second set of edge points representative of said at least two intersecting edges; (iii) applying regression analysis to the first and second sets of edge points, respectively; and (iv) determining a refined position of the at least one interest point as the intersection of regression functions representative of the first and second sets of edge points. Also provided is an image capture system comprising: at least one land-based mobile robot; at least two cameras that are fixedly mounted on each said at least one mobile robot; and a processing module, adapted to (i) receive and store image data obtained by the cameras of at least one array pattern that comprises a plurality of interest points; (ii) process said image data to determine a provisional location of the interest points on each captured image; (iii) refine the provisional location of the interest points by regression analysis of data points representative of at least two edges that meet at or near the interest points, the refined location being determined as the intersection of regression curves thereby obtained; and (iv) optimize camera calibration parameters based on the refined position of the interest point.

In the present context, the term "camera image" or "image" should be understood to also mean "camera frame" or "camera frames" or "frames".

The term "interest point", in the present context, refers to a point in an image that can be characterized by at least: a) being clearly defined on the image, b) having a well-defined position in space, c) the local image structure around the interest point being rich in terms of local information content, preferably so that it has significant texture (for example, has a significant variety in pixel saturation) in two-dimensional space, and d) the interest point is stable and/or not sensitive with respect to illumination and/or brightness variations, such that the interest point can be computed with high degree of repeatability. An exemplary interest point is a corner. Corners in turn can be considered to be defined as the meeting point or intersection of two or more edges in an image. Note, that interest points exist both on images and on array patterns, and the present document refers to both as "interest point". It is clear for the person skilled in the art which is meant from the context.

In a preferred embodiment, the interest point is positioned at the meeting point of the edges. In some embodiments, the interest point is at the intersection of two or more edges. The partial area that is selected may surround the at least one interest point. As will be apparent from the following disclosure, an initial estimate of the position of an interest point may be incorrect in that the initial estimate does not place the interest point at the intersection or meeting point of two edges. One goal of the method disclosed herein is to provide a reliable position of the interest point, ideally such that its refined position is a very good approximation of its true position in the image which can be at the meeting point (or intersection) of two or more edges.

Although the present invention is applicable for the calibration of any number of cameras, it is especially useful for the calibration of multiple cameras. Preferably, the invention relates to the simultaneous calibration of a plurality of cameras, such as 2 or more cameras, 3 or more cameras, 4 or more cameras, 5 or more cameras, 6 or more cameras or 7 or more cameras. In some preferred embodiments, the number of cameras is in the range of 2 to 20, such as 3 to 15, such as 4 to 12, such as 5 to 10, such as 7 to 10, especially 7 to 9 cameras. The cameras are preferably arranged in a fixed position on a single structure or frame. Preferably, the structure is a mobile robot, in particular a land-based mobile robot.

The calibration method of the invention is based on the processing of images that are captured by the cameras to be calibrated. Preferably, a plurality of images is captured. It is especially preferable to capture a plurality of images that represent different poses of the cameras with respect to the calibration pattern.

In the present context, the term "pose" refers to the position and orientation of an object in three-dimensional space. One object of the invention is therefore to determine the pose of each of the cameras that are being calibrated. The term "position and tilt" is used herein as "pose".

One or more images of the calibration pattern can be captured for a first pose (first position/orientation) of the cameras. This process can be repeated for a second pose of the cameras, a third pose of the cameras, and so on. This way, a series of images is captured, representing different poses of the cameras.

The images can be stored to a file following their capture. The images can be stored locally, e.g. on a memory card within the structure (e.g., mobile robot or robot) on which the cameras are mounted. The images can also be stored on a remote server, that can be wirelessly connectable to the structure.

The images can also be processed in real-time as they are captured. This means that features (e.g., corners) are detected and defined on the images as they are captured, and the images subsequently deleted. This has the advantage that storage space and/or data upload requirements are minimized.

In some preferred embodiments, the robot can be autonomous and/or semi-autonomous. That is, the robot can be adapted to navigate and/or to drive autonomously during the collection of data for the camera calibration. The robot can also collect a portion of the data used in the calibration. In some embodiments, the robot is adapted to navigate autonomously for at least 50% of the total operating time of the calibration. In some other embodiments, when gathering image data for the camera calibration, the robot can be remotely controlled by a remote operator. That is, the robot can be controlled and/or driven by a person and/or by a server and/or by a second processing component.

The robot can also be part of an assembly of robots, i.e. two or more mobile robots, the robots can be adapted to communicate, or exchange data via their respective communication components, or communicate with a remote server.

In some embodiments, the camera calibration is performed on the mobile robot or vehicle. Some or all of the steps of the calibration (except image capture, since this is necessarily done on the robot) can also be performed on a remote server. In such embodiments, the mobile robot or vehicle preferably has at least communication device for communicating with a remote server that carries out at least some steps of the calibration process. For example, the image processing and determination of refined corner positions can be performed on the robot, and the results be provided together with other information such as robot pose (from gyroscope(s)) to a remote server. Subsequent optimization of camera calibration parameters can be performed on the remote server.

In a general sense, an interest point is any point on an image that has a well-defined position and can be detected robustly. For example, the interest point can be a local intensity maximum or minimum, a line ending or a local maximum or minimum along a curve.

A particularly useful interest point is a corner. Intuitively speaking, a corner can be considered to represent a junction of contours. For the purpose of the present disclosure, a corner can generally be defined as the intersection of two or more edges. Alternatively, a corner is defined as a point for which there are two different edge directions in the local neighborhood of the point (the corner).

As a consequence of the close relationship between the general concept of an interest point and the specific concept of a corner, methods for detecting corners can in many cases also be applied to detect other types of interest points.

There are methods known in the art for detecting corners. These include for example the method by Harris and Stevens (Proceedings of the 4th Alvey Vision Conference, (1988) pp. 147-151), an improvement of an earlier method by Moravee (1980; Tech Report CMU-RI-TR-3 Carnegie Mellon University, Robotics Institute), both of which are hereby incorporated by reference. Other methods include the Shi-Tomasi corner detector (Shi & Tomasi (1994), "Good Features to Track", in $9^{th}$ IEEE Conf on Computer Vision and Pattern Recognition), the Forstner corner detector (Forstner & Gulch (1987), "A fast operator for detection and precise location of distinct points, corners and centres of circular features, ISPRS Intercommission Workshop), Wang & Brady (Image and Vision Computing (1998), 13:695-703), SUSAN (Smith & Brady, Int J Computer Vision (1997), 23:45-78) and Trajkovic and Hedley detector (Image and Vision Computing (1998), 16: 75-87), all of which are hereby incorporated by reference.

Any suitable corner detector can in principle be used to provide a provisional location of a corner on the array pattern. It can be particularly useful to use the Harris corner detector. The Harris algorithm considers the differential of a corner score (which can be defined as the smallest sum-of-square differences (SSD) between pixels) with respect to direction, i.e. it determines the derivative of the image. In a "flat" region, i.e. a region with little change, there is little or no change in any direction on the image. Along an edge, there will be little or no change along the edge but large changes perpendicular to the edge. A corner, however, is characterized by a large change in all directions moving away from the corner.

Mathematically, the detector considers the change in intensity in an image patch over an area (u, v) when shifted by (x, y):

$$S(x, y) = \sum_u \sum_v w(u, v)(I(u+x, v+y) - I(u, v))^2$$

Where S represents the weighted sum of squared differences between the patches. For patches that are constant or near-constant, the value of S will be close to zero, whereas for a corner, S(x, y) will take on large values in all directions of (x y).

By approximating I (u+x, v+y) as a Taylor expansion, and by letting $I_x$ and $I_y$ be partial derivatives of I, S(x,y) can be approximated as $$S(x, y) \approx \sum_u \sum_v w(u, v)(I_x(u, v)x + I_y(u, v)y)^2,$$

which can be written as $$S(x, y) \approx (x\ y) A \binom{x}{y},$$

where A denotes a structure tensor (a 2×2 matrix computed from image derivatives):

$$A = \sum_u \sum_v w(u, v) \begin{bmatrix} I_x^2 & I_x I_y \\ I_x I_y & I_y^2 \end{bmatrix} = \begin{bmatrix} \langle I_x^2 \rangle & \langle I_x I_y \rangle \\ \langle I_x I_y \rangle & \langle I_y^2 \rangle \end{bmatrix}$$

The Harris detector therefore considers the x and y derivatives for points with a given center of mass. Corners are then characterized by large variations in S in all directions of the vector (x y).

The array pattern can in principle be any pattern comprising repeated shapes that have substantially identical dimensions and include easily detectable corners. The pattern can comprise alternating black and white shapes. Preferably, however, the pattern comprises images having various colors, which makes it easier to uniquely assign detected corners to a particular position within the array. Preferably, the array pattern is a lattice pattern that comprises squares and/or rectangles that have different colors, but wherein each square or rectangle is uniformly colored.

The array pattern can preferably be generally flat, or be provided on a flat surface. It can be preferable that the array pattern be provided on an essentially flat surface.

The pattern can comprise features, such as rectangles or squares, having any plurality of colors, such as two or more, three or more, four or more, five or more, six or more, seven or more, eight or more, nine or more or ten or more colors. For example, the array pattern can comprise from 2 to 10 colors, from 3 to 9 colors, from 4 to 8 colors, from 5 to 7 colors, or from 6 to 8 colors. The array pattern can, in certain embodiments, comprise 2 colors, 3 colors, 4 colors, 5 colors, 6 colors, 7 colors, 8 colors or 9 colors. Preferably, however, each feature (e.g., rectangle or square) is of uniform color.

The color arrangement in the pattern can preferably be arranged so as to minimize the number of interest points such as corners that have an identical arrangement of color patterns surrounding the particular interest point (e.g., corner). For example, consider the case where a white square at its top left corner meets, in a clockwise order adjacent squares that are purple, yellow and purple, respectively. Preferably this square is unique to the pattern, i.e. there are no other corners having an identical arrangement of squares within the pattern. This way, once a corner has been identified, the color of squares adjacent to the square provides the unique position of the square within the pattern.

The array pattern can thus preferably be a color array that comprises an array of features having different colors. The features can be of any shape, but preferably have clear distinct edges so that their meeting point can be easily determined. The features can be of generally rectangular shape. Preferably, however, the features are squares. The features are furthermore preferably uniformly shaded, i.e. there is no color or intensity gradient across the feature. It can be especially preferable that the array comprises a plurality of squares, each of which being of uniform color, and wherein the squares are arranged in the array such that four adjacent squares meet at a single corner. Note, that instead of squares, also non-square rectangles can be used for the purpose of the invention.

The array pattern can in principle be of any size and shape, and contain any number of squares or other shapes that have well defined corners. In practice however it can be useful to use a pattern that contains between about 20 and 200 squares. Each square in the pattern can have width in the range of 1 to 30 cm and a height of 1 to 30 cm. More preferably, the width and/or height of each square can be in the range of about 2 to 20 cm, or about 3 to 15 cm.

The overall array pattern can have any suitable size. It can for example be useful that the overall pattern have a length of about 20 cm to 1000 cm and a height of about 20 cm to 200 cm.

Once the provisional positions of interest points (e.g., corners) have been determined on an image, the positions can be refined. This is preferably done by focusing on a subset of the image that surrounds and includes the corner in question. Alternatively, the calibration of the camera parameters can be performed directly, using the provisional position of the interest points.

The array pattern can in general comprise from 10 to 1000 interest points or more. It can be preferable that the pattern comprise from about 10 to 200 interest points, about 10 to 150 interest points, about 10 to 100 interest points, or about 20 to 100 interest points. When more than one array pattern is provided for the calibration, each of the array patterns can comprise from 10 to 1000 interest points or more, or preferably about 10 to 200 interest points, about 10 to 100 interest points or about 20 to 100 interest points.

The corner can be considered to represent the intersection of two or more edges. Let's consider the case where the corner is represented by the intersection of two edges. Two datasets can be extracted from the image, based on an initial assumption about the position of the corner—a first dataset, representing a first set of edge points defining the first edge, and a second dataset, representing a second set of edge points defining the second edge. Once the two sets of edge points have been extracted, regression analysis can be applied to the datasets, and a refined position of the corner at which the two edges meet defined by the intersection of the two regression curves. Thereby, a refined position of the corner is determined. It can be convenient to apply a linear regression analysis to the two sets of edge points and thereby define the refined corner location as the intersection of the two lines.

Defining two lines, that can preferably be orthogonal, the two datasets can be defined as two sets of data points that are each closer to one of the two lines than the other. One of the two lines can be horizontal, or approximately horizontal, with respect to the array pattern, and the other line can be vertical, or approximately vertical. Then, the two sets of edge points can be defined by their closeness to one of the two lines; a first set is closer to the "horizontal" line than the "vertical" line, and vice versa.

Edges can in general be defined or identified using methods known in the art. One such method is the Canny edge detector. This algorithm is based on Gaussian smoothing of images. The algorithm smoothest an intensity image and subsequently produces extended segments by following high gradient magnitudes from one neighborhood to another. The two edge point data sets can thus be generated and/or supplemented using the Canny edge detection algorithm or other similar algorithms known in the art.

The process of determining sets of edge points can be repeated for a revised corner position, and the position of a further refined corner determined as the intersection of two regression curves (e.g., lines obtained by linear regression) that are applied to the two sets of edge points defined in any such iteration. The process of detecting edge points and establishing a refined corner position as the intersection of lines that are fitted through the edge points ("horizontal" and "vertical") can be repeated until there is little or no difference between a refined corner and the corner defined by the previous iteration, in which case the algorithm has converged to a stable value and the refinement is completed.

Camera calibration involves the determination of various internal and external parameters that describe the camera properties. Camera calibration parameters in general can comprise camera position, camera pose, camera optical center, camera focal length and camera distortion parameters. The intrinsic parameters can comprise camera focal length, camera optical center and camera distortion parameters. The extrinsic parameters can comprise camera position, camera pose.

Preferably, the camera calibration according to the invention determines parameter values that describe at least one of: mobile robot poses for the captured images; poses of the array patterns; poses of the cameras; and camera properties of each of the cameras, including optical center, focal length and distortion parameters.

In a preferred embodiment, the camera calibration determines parameters that describe all of the foregoing, i.e. mobile robot poses for the captured images; poses of the array patterns; poses of the cameras; and optical center, focal length and distortion parameters of each of the cameras.

In some embodiments, the mobile robot comprises at least one gyroscope for determining robot pose. The robot can comprise a plurality of gyroscopes, such as 2 or more gyroscopes, 3 or more gyroscopes or 4 or more gyroscopes. It can be preferable that the robot comprise 4 gyroscopes.

The camera calibration preferably determines and optimizes all of the foregoing parameters simultaneously. That is, based on the refined positions of corners on the array boards on all images captured for all of the cameras, the camera calibration parameters are simultaneously optimized.

It can be preferable to fix the position of one array pattern. Thus, in an embodiment that comprises at least two array patterns, the position of one of the array patterns is fixed to represent a reference of the world frame during the optimization.

It can also be convenient to fix the position of one of the cameras during the optimization. Then, the position of the other cameras can be determined relative to the fixed camera.

The cameras can preferably be mounted on an autonomous or semi-autonomous robot. The robot can preferably be a land-based robot. The robot can have at least two cameras, preferably 3-15 cameras, more preferably 5-15 cameras, more preferably 7-12, and even more preferably 7-9 cameras.

A large number of poses of the mobile robot can be performed during the calibration. Thus, it can be preferable that at least one image be captured for 10 to 1000 poses, preferably 50 to 500 poses, more preferably 100 to 300 poses, of each of the cameras.

At least two of the cameras can represent a pair of stereo cameras. It can be preferable to further refine the calibration of stereo cameras using epipolar constraining. This can be done either during the camera calibration or as a supplementary refinement following completion of the camera calibration according to the invention.

Accordingly, the invention can comprise a further step, wherein the calibration of any stereo cameras are further refined upon completion of the refining. It can be useful, during such further refinement, to neglect all other cameras on the mobile robot so as to maximize the precision of the calibration of the stereo cameras.

Alternatively, epipolar constraints are incorporated in the camera calibration algorithm as defined herein. In other words, in addition to the camera calibration determining parameters that describe the mobile robot poses for the captured images; poses of the array patterns; poses of the cameras; optical center, focal length and distortion parameters of each of the cameras; the calibration can optimize parameter values for stereo cameras using epipolar constraints.

Prior to processing of camera images, it can be convenient to convert the images to Lab color space. Thus, in certain embodiments of the invention, prior to the processing images, the images are converted from RGB color space to Lab color space. The conversion can be done on the images as captured, or the conversion can be done on stored images.

In some embodiments, the camera calibration algorithm can comprise an optimization routine that optimizes camera calibration parameters, including at least one mobile robot/vehicle pose and the position of physical objects based on extracted features (e.g., corners). The algorithm can use gyroscope information from the mobile robot to determine mobile robot poses. That is, the algorithm can for example take one or a plurality of mobile robot poses, and optimize their values based on the lines extracted from camera images. In some embodiments, the algorithm can also take data from other sensors into considerations, for example GPS sensor or other sensors listed above and below.

In some embodiments, each of the robot cameras can be adapted to capture 3 to 5 images or frames per second, preferably 4 images or frames per second.

In the following, there is provided a description of one preferred embodiment of the calibration method that can be implemented on a processing component of the robot or a remote server.

The calibration optimization can be implemented as a probabilistic algorithm that takes certain input variables and returns certain output variables. Input variables can comprise the robot's pose, the refined corners detected on the images of the array patterns. The output variables can comprise, for example, robot poses during the calibration process, poses of the array patterns, position and tilt of all cameras, and camera properties of each camera, such as optical center focal lengths and distortion parameters. Note, that position and tilt refers in this document to the pose.

If multiple array patterns are used, the position of one board is fixed and serves as a reference for the world frame. Furthermore, it can be convenient to also fix the position of one of the cameras, i.e. only search for its optimal rotation. Accordingly, when applied to a robot having N (e.g.: 9) cameras, the position of one of the cameras is fixed, and the position and rotation of the other N−1 (e.g.: 8) cameras is determined by the algorithm, as well as the rotation of the fixed camera.

The algorithm compares what is observed (the corners on images) and what would be expected to see given certain parameter values (i.e. camera properties, etc.). Measured errors between what is seen and what is expected are added up to get a number that is a measure of the quality of the (optimized) parameters. Subsequently, parameter values are changed in a smooth fashion to reduce the error until further optimization does not lead to an improvement—the algorithm has found the optimal (best) solution.

The optimization can be performed in an analogous manner to map generation, where the "map" comprises the relevant poses of the robot, the cameras and/or the array patterns and/or camera properties. Let it be assumed that the robot is driving through or in an area that has visible, fixed array patterns. The robot can be driving autonomously or semi-autonomously, or the robot can be manually controlled. The robot's gyroscope detectors provide rotation information and the cameras provide camera images. Potentially other readings that are useful for camera calibration could be incorporated into the method. Two quantities can be defined in this context: a "map" (M) and sensor readings (R). The values in M can include robot poses during the calibration process, poses of the array patterns, position and tilt of all cameras, and camera properties of each camera, such as optical center, focal lengths and distortion parameters. The map M is therefore a collection of parameters that constitute the camera calibration problem to be solved. The map can be simply defined as a vector of numbers:

$$M=(m_1, \ldots, m_{|M|})$$

The values of M are unknown in the problem; as a consequence, the solution to the problem involves that of determining the values in M. The sensor readings R (gyroscope readings) can likewise be defined as a vector of numbers, $$R=(y_1, \ldots, y_{|R|})$$

The vector is the result of an actual calibration run and is a constant quantity in the following Bayesian statement:

$$P(M \mid R) = \frac{P(R \mid M)P(M)}{P(R)}$$

This statement is simply the Bayer theorem that establishes the relationship between conditional probabilities. It establishes the relationship between conditional probabilities P(A|B) (probability of A given B) and P(B|A) (probability of B given A). This is well known to the person skilled in the art.

That is, if some map (i.e. parameters in M) was known, the relationship of its probability given the sensor (gyroscope) readings to the probability of having such readings or map independently at all could be established. These probabilities can be almost impossible to numerically quantify. However, the exact values these probabilities are actually not needed. Rather, we can find the "best" map, defined as:

$$M_{BEST} = \underset{M \in \mathbb{M}}{\arg\max}\, P(M \mid R)$$

This equation defines the map maximizing the probability given the obtained sensor readings and provides the best solution for the parameters in M. From a camera image, a series of refined corners are obtained. These corners correspond to landmarks on the map.

The map M contains parameters that define the pose of the robot (vehicle), the pose of each of the cameras (except for the position of one camera which can be fixed) and the pose of the boards. The refined corners are features on each of the boards.

The map M can be considered to contain two parts: the path the robot took (i.e. the robot and camera poses during the collection of images used in the calibration) and the location of the landmarks (on the array patterns), so that $$M=(M_P, M_L)$$

The association can be done as an iterative algorithm smoothly adjusting landmark candidates and culling them as needed. For example, corners that seem to have large errors associated with them can be pruned by the algorithm. Also, error capping can be used to remove (prune) associations that are deemed to be wrong.

The sensor readings obtained during a calibration run are constant. Therefore, in the original Bayesian statement, $P(R) \approx \text{const}$. The quantity $P(M)$ corresponds to the probability of getting a certain map M from the set of all possible maps. This set is unrestricted, and therefore very large. In practice, when looking at likely maps, only the ones that are relatively close to the landmarks (corners) are considered. The probability of obtaining such M from the set of all maps is about the same. Therefore, also $P(M) \approx \text{const}$. What is left to estimate is $$P(M|R) \propto P(R-M)$$

That is, the probability of the map given certain readings is proportional to the probability of the readings given the map. $P(R|M)$ can be quantified in the following way. $P(R|M)$ is the probability of getting sensor readings R if given map M. Sensor readings contain errors. A further approximation can be made by stating that the sensor readings are approximately normally distributed, that is $$R \sim N(\mu, \Sigma)$$

where $\mu$ are the error free values (ground truth that is not known) and $\Sigma$ is the covariance matrix that can be derived from the properties of the sensors and the readings taken.

The form of the probability $P(R|M)$ can now be approximately stated as:

$$P(R|M) \cong C_w e^{-\frac{1}{2}(\mu(M)-R)^T \Sigma^{-1}(\mu(M)-R)},$$

where $C_w$ contains the normalization constant. The goal is to maximize $P(M|R)$—this is equivalent to maximizing the value $P(R|M)$ or equivalently minimizing its negative logarithm:

$$\ln P(R|M) = -\frac{1}{2}(\mu(M)-R)^T \sum\nolimits^{-1}(\mu(M)-R) + C_L,$$

$$M_{BEST} = \underset{M \in \mathbb{M}}{\operatorname{argmin}}(\mu(M)-R)^T \sum\nolimits^{-1}(\mu(M)-R),$$

$$S(M) = (\mu(M)-R)^T \sum\nolimits^{-1}(\mu(M)-R),$$

So, to find the best map $M_{BEST}$, the sum $S(M)$ should be minimized. The problem of finding the best map has been reduced to one of nonlinear minimization. The process can run as an iterative optimization algorithm aiming to maximize the overall probability of obtaining a certain map, i.e. a certain set of parameters in M given the known sensor readings.

The calibration algorithm can be based on input of hundreds of robot poses. The array patterns or boards do not need to be observed by all of the cameras for every pose. In fact, some of the cameras may not see some, or any, of the array patterns for some of the poses, while other cameras may not see some, or any, of the array patterns for other poses. Further, only a portion of each array pattern needs to be visible to any given camera at any given time. The identity of each particular corner in an array pattern can be provided by the color arrangement of surrounding squares/rectangles.

The invention also relates to an image capture system. The image capture system can be adaptable to collect input data (e.g., images, gyroscope readings) used in the calibration process.

The image capture system can preferably comprise at least one land-based robot that comprises a plurality of cameras that are fixedly mounted on the mobile robot or vehicle.

The cameras of the robot can be for example similar to smartphone cameras. They can be adapted to capture 1-10 images per second, more preferably 3-5 images per second or more preferably 4 images per second. The camera viewing angles can be 10°-120°, more preferably 40°-100°, more preferably 60° by 80°. The robot can comprise a plurality of cameras. In a preferred embodiment, the robot comprises at least 4 (four) cameras. In a more preferred embodiment, the robot comprises 9 (nine) cameras. The cameras can be placed anywhere around the body of the robot, preferably in positions optimizing the viewing angles of the different cameras. Some cameras can be stereo cameras. In a preferred embodiment, one pair of front cameras are stereo cameras. In a more preferred embodiment, the robot comprises 4 (four) pairs of stereo cameras. In this preferred embodiment, the stereo cameras are positioned in the front of the robot, on both sides of the robot and on the back of the robot. One more camera can be positioned in the front of the robot. The stereo cameras can be used to triangulate objects captured in the visual images. Depth perception of the visual images can be improved with stereo cameras. The separation between the stereo cameras can be 5-20 cm. In a preferred embodiment, the separation between each of the front and back stereo cameras is 5-10 cm and the separation between the stereo cameras arranged on the side of the robot can be 15-20 cm. The cameras can be placed on the robot so as to take landscape orientation visual images and/or portrait orientation visual images. Landscape orientation visual images can be understood to mean visual images wherein the wider camera capture angle is approximately parallel to the ground and the narrower camera capture angle is approximately perpendicular to the ground. In a preferred embodiment, the side and back cameras are placed in a portrait orientation and the front cameras are placed in a landscape orientation.

The processing module of the image capture system can be part of and/or comprise a System on a Chip (SoC), for example similar to smartphone processors. A memory component can be part of the same SoC. The processing module can be adapted to determine at least a part of the camera calibration using the visual images captured by the cameras.

The processing module can thus be on the robot. The processing module can also, or alternatively, be provided on a remote server.

The processing module can be adapted to determine refined corner position on images of the array patterns captured by the cameras. The refined corners can subsequently be used in the optimization of camera calibration parameters, as described in the method in the foregoing. The processing module, when present on the robot, can be adapted to also perform the optimization. Alternatively, the robot supplies the refined corner positions to a remote server on which the processing module is provided, preferably via a wireless connection. The images can be stored on the robot prior to the determination of the refined corners. The images can also be processed in real-time and subsequently deleted from memory to save storage space. Information about refined corner positions can be stored in a memory component of the robot. The information can also be provided in real time to a remote server and not saved on the robot.

The result from the calibration process, i.e. the values in M, can be saved onto a memory component of the robot. Alternatively, or additionally, the result is downloaded onto a memory component on a remote server.

The cameras on the robot can take visual images of the robot's surroundings during its roving in an operating area. The cameras can be adapted to take images with a frequency of 1 to 10 images per second, such as 2 to 8 images per second, or 3 to 7 images per second, or 3 to 5 images per second, or 4 to 6 images per second. In one embodiment, the cameras are adapted to take images at a frequency of 4 images per second. Preferably, image capture is performed continuously during data collection (for camera calibration at the described frequency, i.e. the robot is preferably adapted to take images continuously using at least one, and preferably all, of the cameras during this operation. The visual images can then be combined into one file and preprocessed. Preferably, the images from different cameras are taken simultaneously. This can mean that the time difference between the images from different cameras is considerably shorter than the time difference between successive images that are processed. After preprocessing, a file containing preprocessed image data can be separated into individual image files representing the different cameras, and straight lines used for robot localization can be extracted from the individual images.

The robot can further comprise a communication component adapted to exchange data with one or more server, particularly image and/or calibration (map) data. The server can comprise multiple servers and/or a cluster of servers and/or one or more cloud servers. In one preferred embodiment, the server is a cloud server. In another embodiment, the server comprises a cluster of servers, some of which can be cloud servers. The server can store, analyze and/or send out data, such as for example map and localization related data. The server can also perform calculations, for example the server can perform the optimization part of the algorithm. The communication component can comprise at least one slot for a Subscriber Identity Module (SIM card), preferably two slots for two SIM cards. The use of two SIM cards is an advantage, since it increases reliability and allows for simultaneous communication via both SIM cards for larger and/or faster data transmission. In a preferred embodiment, two different mobile operators are used for operation using the two SIM cards. In this case, if one mobile operator does not provide coverage in some part of the robot's area of operation, the robot can still communicate via the other SIM card. The communication component can also comprise a different wireless communication standard than a SIM card. The communication component can comprise a wireless modem.

The robot can further be adapted to receive navigation instructions from the server at specific intervals and/or after requesting input from the server. In one embodiment, the robot receives navigation instructions every 50-150 meters. The robot can further send a request for input to the server when faced with an unfamiliar situation. The robot can also request manual input about its navigation, for example when facing hazardous conditions such as crossing a street. During such manual operation, a remote operator can provide navigation instructions to the robot and direct it through the hazard, such as across the street. Once the robot has reached a safe environment, the operator can instruct the robot to resume autonomous navigation. The operator can further communicate with people in the immediate surroundings of the robot through the microphone and speakers that can be mounted on the robot. The robot can however continue to update its localization during manual control.

The present invention is also defined by the following numbered embodiments.

1. A method of calibrating at least one camera, the method comprising steps of:
   a. capturing at least one image of at least one array pattern, said image comprising a plurality of interest points, with at least one camera for at least one pose of each of the at least one camera;
   b. processing said at least one image to determine a provisional location of at least one interest point on the at least one image;
   c. refining the provisional position of said at least one interest point on the at least one image by:
      i. selecting a partial area of the image that includes at least one interest point and at least a portion of at least two edges that meet at or near the interest point,
      ii. defining at least a first and second set of edge points representative of said at least two edges;
      iii. applying regression analysis to the first and second sets of edge points, respectively;
      iv. determining a refined position of the at least one interest point as the intersection of regression functions representative of the first and second sets of edge points; and
   d. optimizing camera calibration parameters based on the refined position of the at least one interest point on the at least one image.
2. The method of the previous embodiment, wherein the optimizing comprises estimating parameter values that describe at least one or a combination of:
   poses of the array pattern(s);
   poses of the plurality of cameras; and
   camera properties for each of the plurality of cameras, preferably at least optical center, focal length and distortion parameters of each of the cameras.
3. The method of the previous embodiment, wherein the optimizing comprises estimating and simultaneously optimizing parameter values that describe at least:
   mobile robot poses during the capturing of images;
   poses of the array patterns;
   poses of the plurality of cameras; and
   camera properties for each of the plurality of cameras, preferably at least optical center, focal length and distortion parameters of each of the cameras.
4. The method of any one of the previous embodiments, wherein during the optimizing, the position of at least one camera is fixed.
5. The method of any one of the previous embodiments, wherein during the optimizing, the pose of at least one array pattern is fixed.
6. The method of any one of the previous four embodiments, wherein prior to the optimizing in step (d), the position of the at least one interest point is further refined by repeating steps ii-iv at least once again.
7. The method of the previous embodiment, wherein the refining is further repeated until a converging position of the interest point is reached.

8. The method of any one of the previous embodiments, wherein the at least first and second set of edge points are defined by
   i. applying an edge detection algorithm to the image data in the region of interest to generate a set of edge points that includes the at least two intersecting edges;
   j. defining at least two lines that intersect at the provisional interest point; and
   k. categorizing the set of edge points into at least a first and a second set of edge points based on the distance of the edge points within each set to each of the lines, such that the edge points within a first set are closer to one of the lines than to any other line defined in step b).
9. The method of the previous embodiment, wherein the two lines are orthogonal.
10. The method of any one of the previous embodiments, wherein the at least one camera comprises at least two cameras that are fixedly arranged on a mobile robot.
11. The method of any one of the previous embodiments, wherein the at least one camera is fixedly arranged on an autonomous or semi-autonomous land-based robot.
12. The method of any one of the previous embodiments, comprising capturing a plurality of images by at least two cameras, preferably 3-12 cameras, more preferably 5-10 cameras, and even more preferably 7-9 cameras.
13. The method of any one of the previous embodiments, wherein the image is stored as a camera image file, and wherein the processing is based on the image file.
14. The method of any one of the previous embodiments, further comprising repeating steps a-c for at least two poses of each camera, and optimizing camera calibration parameters from the refined location of interest point obtained from images captured for the at least two poses.
15. The method of any one of the previous embodiments, wherein the optimizing is performed by simultaneously optimizing camera calibration parameters for all of the cameras.
16. The method of any one of the previous embodiments, wherein at least one image is captured for each of 10 to 1000 poses, preferably 50 to 500 poses, more preferably 100 to 300 poses, of each of the cameras, and wherein the optimizing is performed by simultaneously optimizing camera calibration parameters for all of the cameras across all of the poses.
17. The method of any one of the previous embodiments, wherein the calibration parameters comprise intrinsic and extrinsic camera calibration parameters.
18. The method of any one of the previous embodiments, wherein the extrinsic and intrinsic camera calibration parameters comprise camera position, camera pose, camera optical center, camera focal length and camera distortion parameters.
19. The method of any one of the previous embodiments and comprising features of embodiment 10, wherein the at least two cameras comprise at least one pair of stereo cameras.
20. The method of the previous embodiment, further comprising refining the stereo calibration of the at least one pair of stereo cameras upon completion of the optimizing.
21. The method of any one of the previous embodiments, wherein the interest point is a corner.
22. The method of any one of the preceding embodiments, wherein the array pattern comprises a plurality of squares, and wherein the interest point is a corner at the meeting point of four squares on the pattern.
23. The method of any one of the previous embodiments, wherein prior to the processing in step (b), the image file is converted from RGB color space to Lab color space.
24. The method of any previous embodiment, wherein the provisional location is determined by analysis of the derivative of signal intensities in at least a portion of the image.
25. The method of any one of the previous embodiments, wherein the at least one array pattern is provided on a planar surface, the pattern comprising a plurality of rectangles or squares.
26. The method of any one of the preceding embodiments, wherein the array pattern comprises a plurality of squares having identical dimensions and that are arranged in adjacent positions such that at least two sides of each square meets a side of an adjacent square, each square having a uniform color, and wherein the pattern comprises squares having two or more colors.
27. The method of any one of the preceding embodiments, wherein the array pattern comprises from 10 to 100 interest points.
28. The method of any one of the previous two embodiments, wherein the pattern comprises squares or rectangles of three or more different colors, four or more different colors, five or more different colors, or six or more different colors.
29. The method of any one of the previous three embodiments, wherein the pattern comprises squares or rectangles of 4 to 10 colors, preferably from 5 to 9 colors, more preferably from 6 to 8 colors.
30. The method of any one of the previous four embodiments, wherein the pattern comprises squares that are arranged so as to minimize the number of corners having an identical color arrangement about the corner, and preferably so that the color arrangement of squares around each corner in the pattern is unique within the pattern.
31. The method of any one of the previous embodiments, wherein prior to the optimizing, the refined location of each interest point is uniquely assigned based on the color pattern in the array.
32. The method of any one of the preceding embodiments, wherein regression analysis comprises performing linear regression of edge points representative of the predicted edges, and wherein the refined location of each interest point is determined as the intersection of lines obtained by the linear regression analysis of the edge points.
33. An image capture system comprising
   a. at least one land-based mobile robot;
   b. at least two cameras that are fixedly mounted on each said at least one mobile robot;
   c. a processing module, adapted to
      i. receive and store image data obtained by the cameras of at least one array pattern that comprises a plurality of interest points;
      ii. process said image data to determine a provisional location of the interest points on each captured image;
      iii. refine the provisional location of the interest points by regression analysis of data points representative of at least two edges that meet at or near the interest points, the refined location being determined as the intersection of regression curves thereby obtained; and iv. optimize camera calibration parameters based on the refined position of the interest points.

34. The image capture system of the previous embodiment wherein the mobile robot further comprises a communication module.
35. The image capture system of the previous embodiment, wherein the processing module is on a server that is in communication with the land-based mobile robot via the communication module.
36. The image capture system of embodiment 33, wherein the land-based mobile robot comprises the processing module.
37. The image capture system of any one of the previous four embodiments, wherein the land-based mobile robot comprises at least three cameras.
38. The image capture system of any one of the previous five embodiments, wherein the land-based mobile robot comprises nine cameras.
39. The image capture system of any one of the previous six embodiments, wherein the land-based mobile robot is an autonomous or semi-autonomous robot.
40. A method of detecting interest points on an image of an array pattern, the method comprising steps of:
   a. capturing at least one image of an array pattern comprising a plurality of interest points with at least one camera;
   b. processing said at least one camera image to determine a provisional location of at least one interest point on the at least one image;
   c. refining the provisional position of said at least one interest point on the at least one image by:
      i. selecting a partial area of the image that includes at least one interest point and at least a portion of at least two edges that meet at or near the provisional position of the interest point,
      ii. defining at least a first and second set of edge points representative of said at least two edges;
      iii. applying regression analysis to the first and second sets of edge points, respectively;
      iv. determining a refined position of the at least one interest point as the intersection of regression functions representative of the first and second sets of edge points.
41. The method of the preceding embodiment, wherein the array pattern comprises a plurality of squares, and wherein the interest point is a corner at the meeting point of four squares on the pattern.
42. The method of any one of the previous two embodiments, wherein prior to the processing in step (b), the image is converted to Lab color space.
43. The method of any one of the previous three embodiment, wherein the provisional location is determined by analysis of the derivative of signal intensities in at least a portion of the image.
44. The method of any one of the previous four embodiments, wherein the at least one array pattern is provided on a planar surface, the pattern comprising a plurality of squares.
45. The method of any one of the preceding five embodiments, wherein the pattern comprises a plurality of rectangles or squares having identical dimensions and that are arranged in adjacent positions such that at least two sides of each rectangle or square meets a side of an adjacent square, each square having a uniform color, and wherein the pattern comprises rectangles or squares having two or more colors.
46. The method of any one of the preceding six embodiments, wherein the array pattern comprises from 10 to 100 interest points.
47. The method of any one of the previous two embodiments, wherein the array pattern comprises squares of three or more different colors, four or more different colors, five or more different colors, or six or more different colors.
48. The method of any one of the previous three embodiments, wherein the array pattern comprises from 4 to 10 colors, preferably from 5 to 9 colors, more preferably from 6 to 8 colors.
49. The method of any one of the previous four embodiments, wherein the array pattern comprises rectangles or squares that are arranged so as to minimize the number of corners at the meeting point of multiple rectangles or squares having an identical color arrangement about the corner, and preferably so that the color arrangement of the rectangles or squares around each corner in the pattern is unique within the pattern.
50. A method of calibration of at least one camera, comprising:
   a. Providing a mobile robot comprising a plurality of cameras that are fixedly mounted thereon;
   b. providing at least two geometrically fixed array patterns, each pattern comprising a plurality of interest points;
   c. capturing a plurality of images of at least a portion of said array patterns using said plurality of cameras for a plurality of poses of the mobile robot;
   d. determining the position of a plurality of interest points within each of the array patterns for images captured in step (c), so as to generate a grid of interest points within each array pattern for different poses of the mobile robot; and
   e. process image information from step d. so as to simultaneously optimize at least
      i. position of said plurality of cameras;
      ii. optical center of each of said plurality of cameras; and
      iii. focal length of each of said plurality of cameras.
51. The method of the previous embodiment, wherein the optimizing comprises estimating parameter values that describe at least one of:
   i. mobile robot poses during the capturing of images;
   ii. poses of the array patterns;
   iii. poses of the plurality of cameras; and
   iv. camera properties for each of the plurality of cameras, preferably at least optical center, focal length and distortion parameters of each of the cameras.
52. The method of any one of the previous two embodiments, wherein during the optimizing, the position of at least one camera is fixed.
53. The method of any one of the previous three embodiments, wherein during the optimizing the pose of one array pattern is fixed.
54. The method of any one of the previous three embodiments, wherein determination of the position of the interest point on an image is carried out by:
   a. processing an image to determine a provisional location of at least one interest point on the image;
   b. refining the provisional position of said at least one interest point the images by:

i. selecting a partial area of the image that surrounds the at least one interest point and includes at least a portion of at least two edges that meet at the interest point, ii. defining at least a first and second set of edge points representative of said at least two intersecting edges;

iii. applying regression analysis to the first and second sets of edge points, respectively; and iv. determining a refined position of the at least one interest point as the intersection of regression functions representative of the first and second sets of edge points.

55. The method of embodiment 50, wherein prior to the optimizing in step (d), the position of the at least one interest point is further refined by repeating steps ii-iv at least once.

56. The method of the previous embodiment, wherein the refining is further repeated until a converging position of the interest point is reached.

57. The method of any one of the previous three embodiments, wherein the at least first and second set of edge points are defined by
i. applying an edge detection algorithm to the image data in the region of interest to generate a set of edge points that includes the at least two intersecting edges;
j. defining at least two lines that intersect at the provisional interest point; and
k. categorizing the set of edge points into at least a first and a second set of edge points based on the geometric distance of the edge points within each set to each of the lines, such that the edge points within a first set are closer to one of the lines than to any other line defined in step b).

58. The method of the previous embodiment, wherein the two lines are orthogonal.

59. The method of any one of the previous embodiments 50 to 58, wherein the at least one camera is fixedly arranged on an autonomous or semi-autonomous land-based robot.

60. The method of any one of the previous embodiments 50 to 59, wherein the mobile robot comprises at least two cameras, preferably 3-12 cameras, more preferably 5-10 cameras, and even more preferably 7-9 cameras.

61. The method of the previous embodiment, wherein the mobile robot comprises at least one pair of stereo cameras.

62. The method of any one of the previous embodiments 50 to 61, wherein images captured by the cameras are stored as camera image files, and wherein the processing is based on such stored image files.

63. The method of any one of the previous embodiments 50 to 62, further comprising repeating steps a-c for at least two poses of each camera on the robot, and optimizing camera calibration parameters from the refined location of interest point obtained from images captured for the at least two poses.

64. The method of any one of the previous embodiments 50 to 63, wherein the optimizing is performed by simultaneously optimizing camera calibration parameters for all of the cameras.

65. The method of any one of the previous embodiments 50 to 64, wherein during the optimizing, the position of at least one camera is fixed.

66. The method of any one of the previous embodiments 50 to 65, wherein at least one image is captured for 10 to 1000 poses, preferably 50 to 500 poses, more preferably 100 to 300 poses, for each of the cameras, and wherein the optimizing is performed by simultaneously optimizing camera calibration parameters for all of the cameras across all of the poses.

67. The method of any one of the previous embodiments 50 to 66, wherein the calibration parameters comprise intrinsic and extrinsic camera calibration parameters.

68. The method of any one of the preceding embodiments 50 to 67, wherein the camera calibration parameters comprise camera position, camera pose, camera optical center, camera focal length and camera distortion parameters.

69. The method of any one of the previous embodiments 50 to 68, wherein the interest point is a corner.

70. The method of any one of the preceding embodiments 50 to 69, wherein the array pattern comprises a plurality of squares, and wherein the interest point is a corner at the meeting point of four squares on the pattern.

71. The method of any one of the previous embodiments 50 to 70, wherein prior to the processing in step (b), the image file is converted from RGB color space to Lab color space.

72. The method of any one of the previous embodiments 50 to 71, wherein an initial location of the interest point is determined by analysis of the derivative of signal intensities in at least a portion of the image.

73. The method of any one of the previous embodiments 50 to 72, wherein the at least one array pattern is provided on a planar surface, the pattern comprising a plurality of squares.

74. The method of any one of the preceding embodiments 50 to 73, wherein the array pattern comprises a plurality of squares having identical dimensions and that are arranged in adjacent positions such that at least two sides of each square meets a side of an adjacent square, each square having a uniform color, and wherein the pattern comprises squares having two or more colors.

75. The method of any one of the preceding embodiments 50 to 74, wherein the array pattern comprises from 10 to 100 interest points.

76. The method of any one of the previous two embodiments, wherein the pattern comprises squares of three or more different colors, four or more different colors, five or more different colors, or six or more different colors.

77. The method of any one of the previous three embodiments, wherein the pattern comprises from 4 to 10 colors, preferably from 5 to 9 colors, more preferably from 6 to 8 colors.

78. The method of any one of the previous four embodiments, wherein the pattern comprises squares that are arranged so as to minimize the number of corners at the meeting point of multiple squares having an identical color arrangement about the corner, and preferably so that the color arrangement of squares around each corner in the pattern is unique within the pattern.

79. The method of any one of the previous embodiments 50 to 78, wherein prior to the optimizing, the refined location of each interest point is uniquely assigned based on the color pattern in the array.

80. The method of any one of the preceding embodiments 50 to 79, wherein regression analysis comprises performing linear regression of edge points representative of the predicted edges, and wherein the refined location of each interest point is determined as the intersection of lines obtained by the linear regression analysis of the edge points.

The above features along with additional details of the invention, are described further in the examples below, which are intended to further illustrate the invention but are not intended to limit its scope in any way.

BRIEF DESCRIPTION OF THE DRAWINGS

The skilled person will understand that the drawings, described below, are for illustration purposes only. The drawings are not intended to limit the scope of the present teachings in any way.

FIG. 2 shows a schematic representation of a calibration pattern that can be used in the method according to the invention.

DESCRIPTION OF VARIOUS EMBODIMENTS

In the following, exemplary embodiments of the invention will be described, referring to the figures. These examples are provided to provide further understanding of the invention, without limiting its scope.

In the following description, a series of steps are described. The skilled person will appreciate that unless required by the context, the order of steps is not critical for the resulting configuration and its effect. Further, it will be apparent to the skilled person that irrespective of the order of steps, the presence or absence of time delay between steps can be present between some or all of the described steps.

Figure 1:
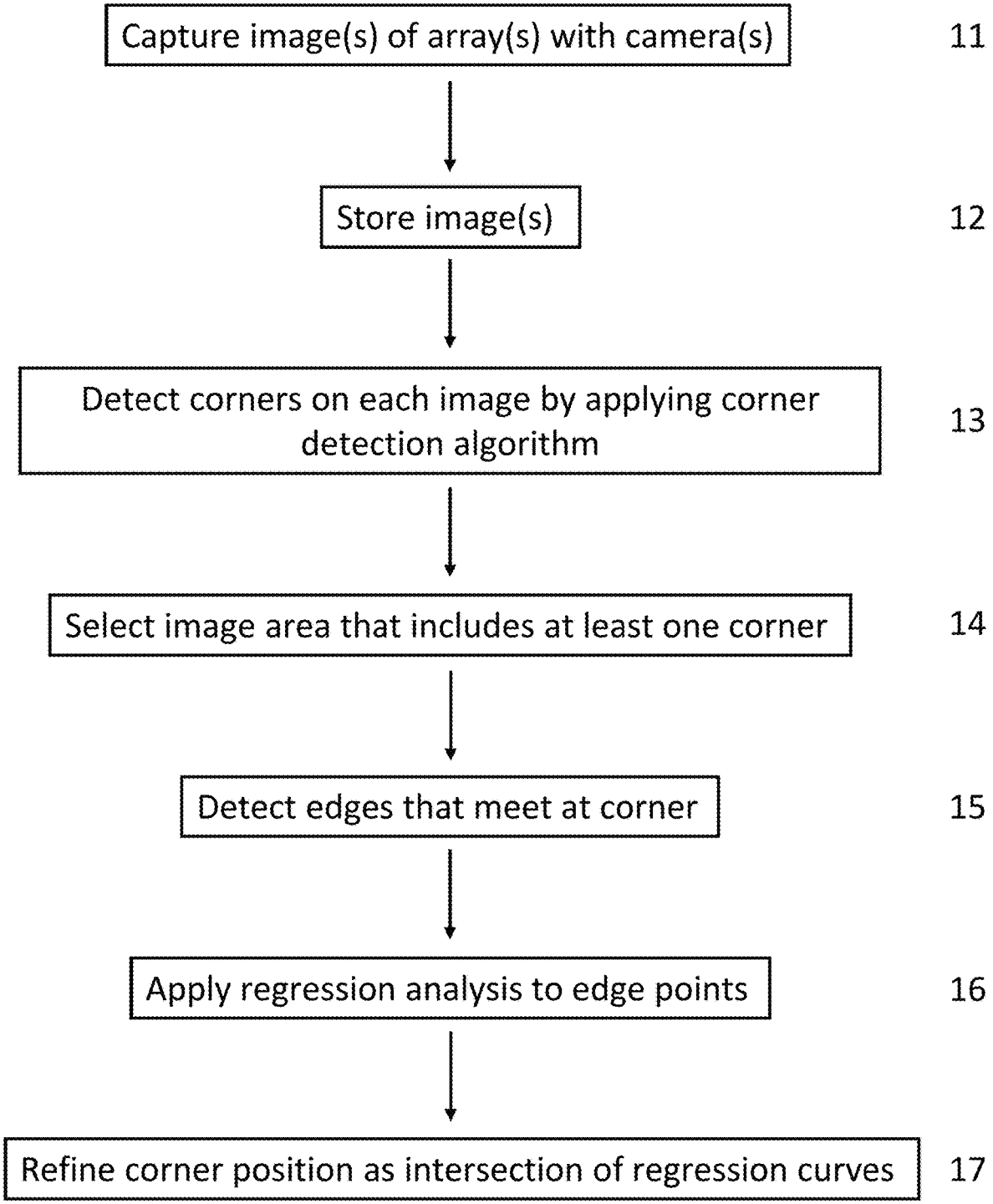
FIG. 1 shows a schematic overview of a corner refinement process according to the invention.

Referring to FIG. 1, there is schematically shown a process for refining the location estimate of interest points on an array pattern. In the specific example shown, determination of corners on array pattern(s) that comprise a plurality of rectangles and/or squares is shown. The array pattern can also comprise a plurality of rectangles of uniform or non-uniform shape and size, or a combination of squares and rectangles. Other shapes are also possible within the array pattern. Thus, as will be appreciated, the method can be applied for determining the location of any type of interest point on an array pattern.

In a first step 11, images are obtained by one or more camera on the mobile robot. Typically, the mobile robot will contain a number of cameras, and the goal of the process is to optimize camera parameters (including pose of cameras, mobile robot, arrays, camera parameters). For this purpose, images are captured for a plurality of poses of the cameras, since that will provide additional constraints during the refinement process. The cameras do not need to see all of the arrays simultaneously. Also the cameras do not need to see entire arrays—images that include a portion of an array can also be used for the calibration algorithm.

Images that are captured can be stored 12 for subsequent processing. This is however an optional step, since images can also be processed in real-time and subsequently deleted from memory. In such a scenario, there is no need to store the images in memory.

The images can be stored on the mobile robot itself or on a remote server. Images can also be transiently stored on the mobile robot, and deleted after transfer of image files from the mobile robot to the server. Images can be stored and/or transferred immediately following the capture of each image. Alternatively, images are captured for a plurality of poses (up to hundreds of poses), stored on the mobile robot and transferred to a remote server for processing after all images that will be used for the calibration process have been captured.

In a third step 13, a corner detection algorithm is applied to the stored image(s). In an intermediate step, it can be preferable to convert images from an RGB color space to Lab color space. In Lab color space, colors are defined by three variables, where L represents the lightness of the color, which is sometimes referred to as color value or color tone, and represents the perception of the brightness of colors in the color space. The other two parameters in this color space are a and b, which represent color-opponent dimensions in the color space. An advantage of the Lab color space is that it includes all perceivable colors, which is advantageous over other color spaces such as RGB or CMYK.

In principle, any known corner detection algorithm can be used to detect the initial location of the corners. It can be useful to use the Harris corner detection algorithm, which is based on the derivative of the image (i.e., differential changes in the image across the different color patterns).

Following the initial detection of corners, the position of the detected corners is refined. For this purpose, a portion of an image that includes at least one corner is selected as shown in 14. Edges that meet at the corner are detected 15, and this can be done by for example assuming that the initially determined corner is at the crossing point of two lines. Two edges can be defined based on such lines—one edge contains data points (edge points) that are closer to one line than the other, and vice versa, as further illustrated with respect to FIG. 3 below.

Once the edge points have been determined, regression analysis 16 can be performed on the edge points. For example, linear regression can be performed on each set of edge points, resulting in two straight lines.

The two lines intersect at a refined corner position as shown in 17. This position represents a new (improved) estimate of the true corner location. Steps 15-17 can be repeated until the position of the corner converges, i.e. regression analysis of edge points defined after each iteration does not lead to a determined (refined) corner location that is markedly different from the position determined in a previous round of the refinement process. When this occurs, the corner position has been refined.

FIG. 2 shows an exemplary calibration pattern that can be used to realize the invention. The pattern comprises 30 squares, each of which is uniformly colored so that each corner in the pattern is unique—i.e. each corner is defined by a unique pattern of colors around the corner. For example, take the corner flanked by the four squares in the top left part of the pattern; the colors are, starting from top left going in an anti-clockwise direction: 1-2-1-2. The next corner to the right on the pattern is flanked by a different color pattern: 2-1-3-1, and so on. Each corner in the internal portion of the pattern is therefore uniquely identifiable by the color pattern surrounding it.

The invention can be performed using different array patterns. Preferably, the array patterns have uniquely identifiable corners, but can otherwise be of any size and shape. The array pattern is preferably designed such that it maximizes the number of features/corners that can be observed while not being overly large and cumbersome to arrange and/or transport. It can be preferable that the array pattern comprise rectangles and/or squares, since those meet at junctions (corners) that are uniquely identifiable in a straight-forward manner.

Figure 3:
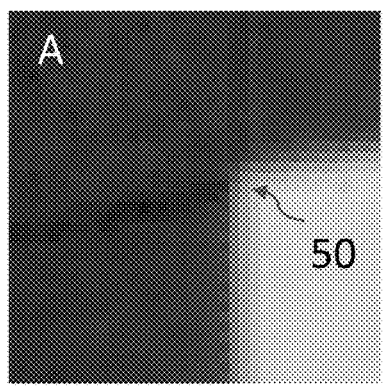
FIG. 3 shows images representing different stages of the corner refinement process.
Figure 3:
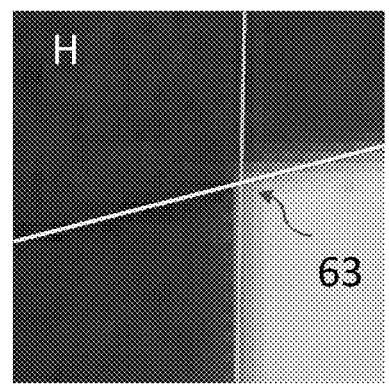
Figure 3:
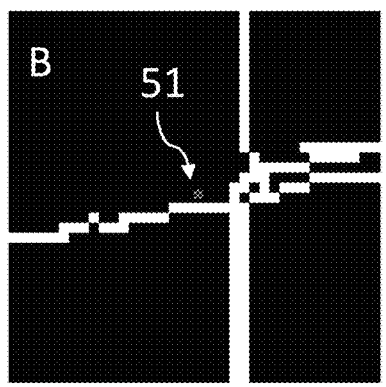
Figure 3:
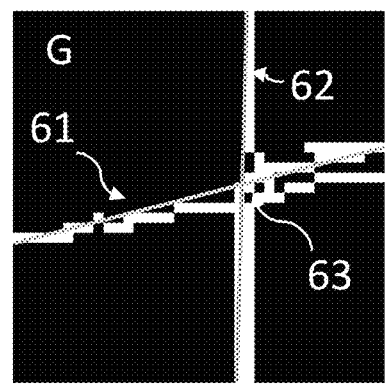
Figure 3:
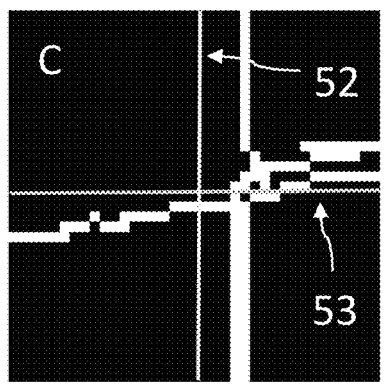
Figure 3:
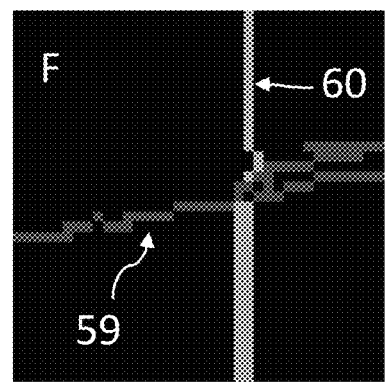
Figure 3:
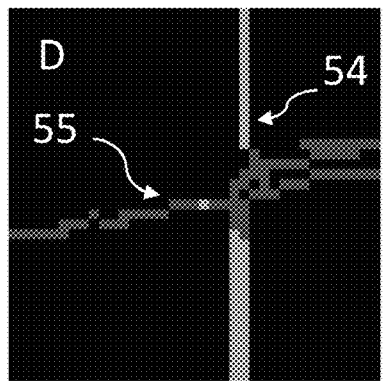
Figure 3:
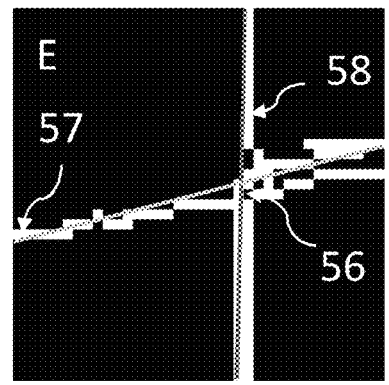

In FIG. 3, there is shown a sequence of images that focus on one region of interest (ROI) of a calibration image, and that is centered on an interest point, in this case a corner.

In (A) a portion of an image is shown, centering on a region that includes one corner 50. A corner detection algorithm is run on the image data in the ROI, resulting in a detected corner which is shown by a dot 51 on the image in (B). As an example, the Harris corner detector can be run to establish this initial estimate of the corner.

As an initial guess, it is thus estimated that the actual corner is in the position originally detected, with perfectly horizontal and perfectly vertical edges passing through it, as shown in (C). Based on this (inaccurate) assumption, edge points in the image are defined and divided into two data sets: one set 55 that lies close to a horizontal line 53, and a second set 54 that lines close to a vertical line 52 (shown in (D). The two lines intersect at the originally estimated corner location. For this purpose, an edge detection algorithm such as the Canny edge detector can be used, to (a) define the edge points and (b) divide the edge points into two edges.

Lines 57, 58 are subsequently fitted to data points 54, 55 in each of the edge point data sets, as shown in (E), where the fitted lines intersect to define a refined corner location 56. The edge points are again determined as in step (D), i.e. as two sets, each of which contains edge data points that are closer to one of the previously determined lines than the other resulting in two data sets 59, 60, that lie close to "horizontal" and "vertical" lines, respectively, as indicated in (F). Lines 61, 62 are then fitted to data sets 59, 60, as shown in (G). The lines intersect at a refined corner 63.

The position of the refined corner 63 differs very little from the previous position of the corner 56 found in the previous iteration. As a consequence, the corner detection has converged to a stable value, completing the refinement. The final result of the corner detection is shown in (H), including the two fitted lines representing each edge and the refined corner position 63.

Figure 4:
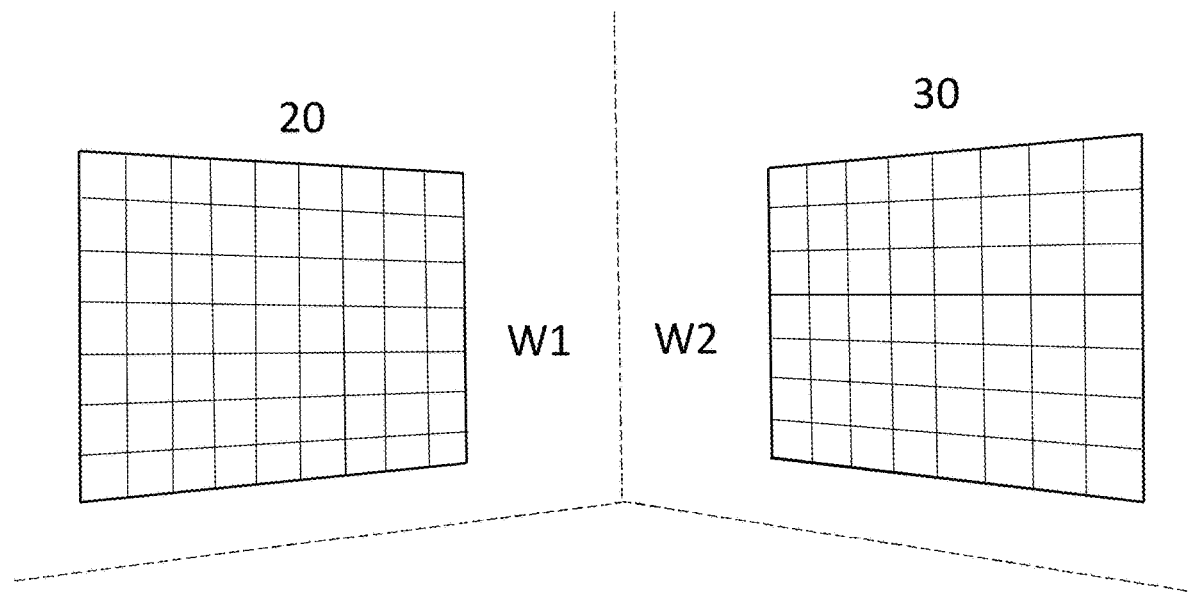
FIG. 4 shows a representation of two array patterns that can be used in the method according to the invention.

FIG. 4 shows an example of an array configuration that can be useful for calibrating cameras on a moving vehicle, such as a mobile robot. The patterns 20 and 30 are arranged on adjacent walls W1, W2. Although not essential, it is preferable that the patterns be flat. The patterns can be printed on boards that are subsequently mounted or fixed on walls. This can be very convenient in practice, since the calibration boards can be moved between locations for calibration purposes. The only strict requirement is that the boards be stationary during data acquisition.

Figure 5:
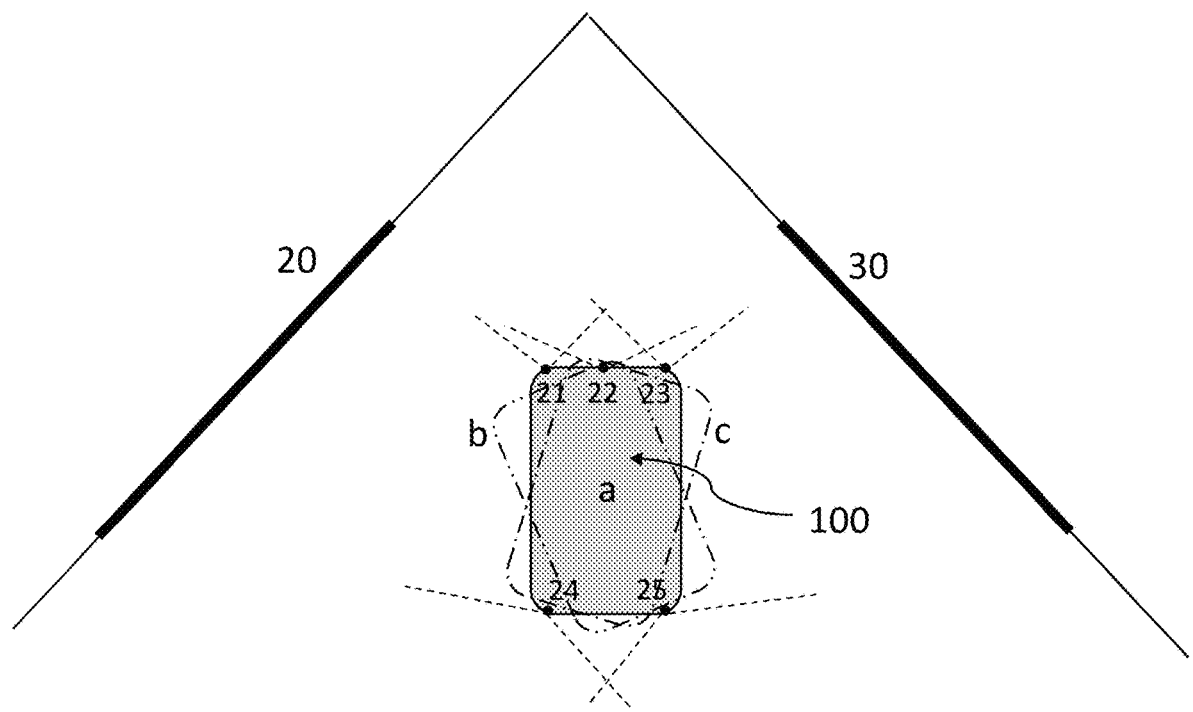
FIG. 5 shows a schematic representation of collection of calibration data according to the invention.

Turning to FIG. 5, it is shown how calibration data can be collected. Shown is a top view of a mobile robot 100 that is positioned in proximity of two calibration boards 20, 30, for example boards that have been mounted as shown in FIG. 4. The robot comprises five cameras 21, 22, 23, 24 and 25. The camera angle of each of the cameras is indicated with dashed lines extending from the position of the respective camera. Although only indicated as an exemplary configuration, it is shown how the viewing angles of the cameras are partially overlapping, in particular those of the front cameras 21, 22, 23. The front center camera 22 can be fixed, and the position of the other cameras determined with respect to that camera. The two other front cameras 21, 23 can also represent a stereo camera pair.

During data acquisition, the robot can be put in a first position, indicated with (a) on FIG. 5. After taking an image with the cameras for this orientation, the robot can be moved to a second position (b), and image acquisition repeated. This process is repeated for a third position (c), and preferably for additional positions of the robot. The different positions can represent rotational and/or translational movement of the robot in the vicinity of the calibration boards. In practice, it is useful that at least one of the boards be at least partially visible for at least one of the cameras. If data collection for the calibration results in camera frames/images that do not contain any useful information (i.e. no useful images of any of the array patterns by the cameras), then those frames can simply be discarded prior to analyzing the data.

The data acquisition results in the collection of images that preferably includes at least one image for each camera for each camera pose during data acquisition process. At least a portion of at least one board is ideally visible to at least one camera for each pose. The minimum portion shown should include at least three corners that represent both dimensions on the board (i.e. not three collinear corners). More realistically, one or both of the boards will be visible to most of the cameras for a large proportion of the obtained images.

Image files can be sent to a server for processing offline, i.e. not on the robot. However, the method does not require off-line processing, and both image processing, including corner detection, and camera calibration could in principle be done on the robot. In some embodiments, corner detection and corner refinement is performed on the robot and subsequent optimization performed on a remote server, using the refined corner position as an input.

Image files can be transferred to a server for processing and optimization of camera parameters. Corner detection and refinement is preferably done with the method as described in the foregoing description and illustrated in the above for FIG. 1.

The output of the corner detection method includes the location of the corners on each image obtained for each of the cameras. The calibration algorithm seeks to optimize the following parameters:
  robot pose during the calibration
  poses of the marker boards
  position and tilt of all cameras
  camera properties, including optical center, focal length and preferably also distortion parameters Ideally, at least two marker boards are used for the calibration. In this instance, it can be convenient to fix the position of one of the marker boards and use that as a frame of reference of the position of the other boards. In a similar fashion, it is convenient to fix the position of one of the cameras on the robot, and determine the position of the other cameras with respect to the fixed camera. As a consequence, only the tilt of the fixed camera needs to be determined.

Figure 6:
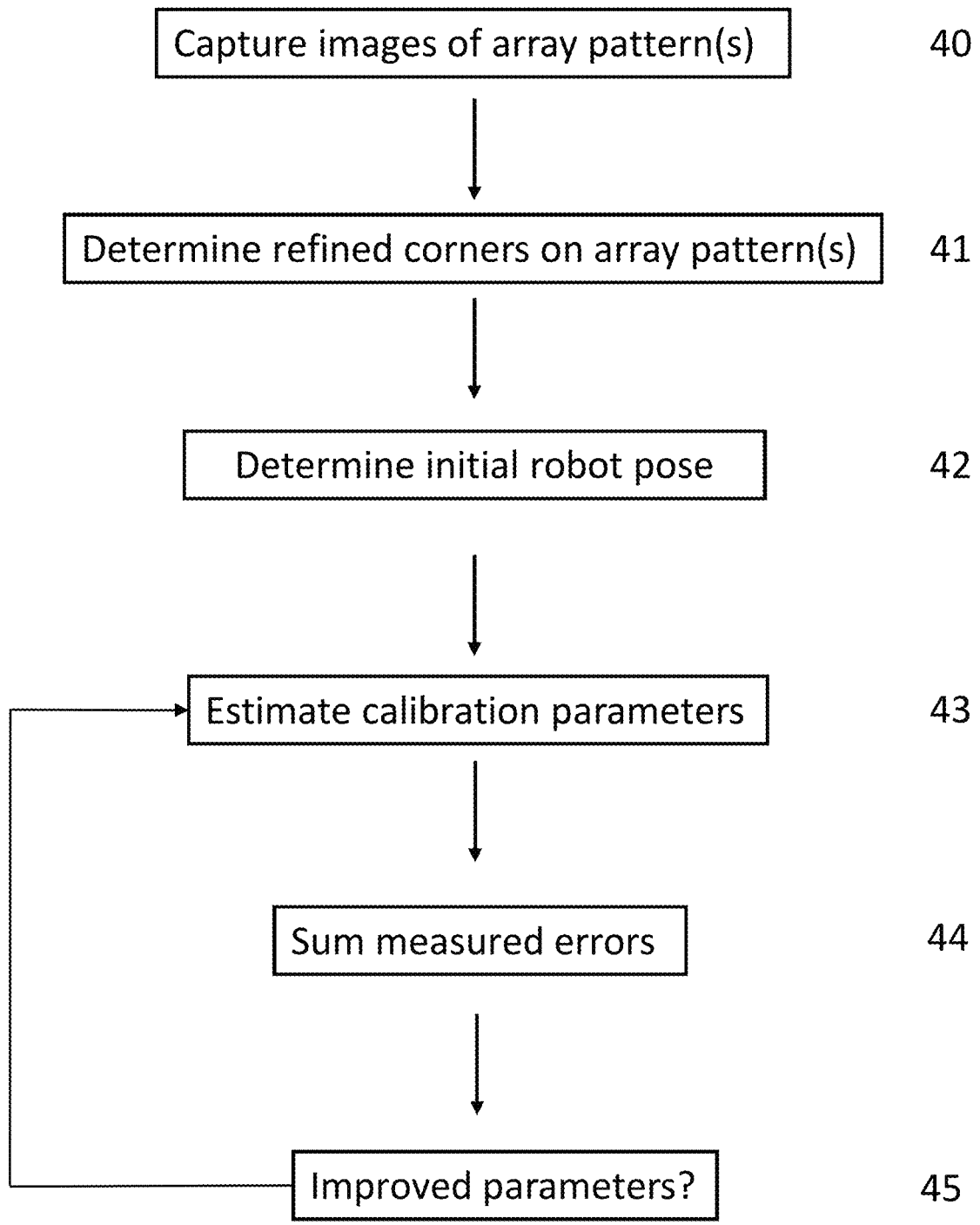
FIG. 6 shows a schematic overview of a camera calibration process according to the invention.

The calibration process determines all parameters related to the above simultaneously. In FIG. 6, a schematic overview of the process is shown. In an initial step 40, a series of images of the calibration board(s) are captured by the cameras on the robot. An exemplary calibration board is shown in FIG. 2, although the skilled person will appreciate that other configurations of the pattern of the board is conceivable. Preferably, there can be two or more boards used for the calibration, for example boards that are arranged in a pattern as shown in FIG. 4. Each of the images is stored to a file, either locally (on the robot) or, more preferably, on a remote server. In a next step 41, the position of corners on the calibration boards are determined. This can preferably be done by a refinement method as described in the above and illustrated in FIG. 3.

An initial estimate for robot pose can be provided by gyroscope data (to provide rotational information) 42. The algorithm subsequently calculates a first estimate of calibration parameters 43, as described in the above. Error estimation is subsequently performed based on observables and the estimated parameters, as indicated in 44. This results in a determination of whether the parameters as determined provide a better estimate of the true parameters, based on the observables. If the errors are still being reduced, the calibration parameters are refined, i.e. step 43 and step 44 are repeated. This is done until there is no further optimization possible, and repeated rounds of estimation and error analysis indicate that an optimal estimate of the parameters has been reached.

Although not shown in this flowchart, there can also be a step of error capping to remove wrong association. There can also be a step of removing (pruning) corners that have large errors associated with them and do not fit the other data.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components.

The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

The term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

It will be appreciated that variations to the foregoing embodiments of the invention can be made while still falling within the scope of the invention can be made while still falling within scope of the invention. Features disclosed in the specification, unless stated otherwise, can be replaced by alternative features serving the same, equivalent or similar purpose. Thus, unless stated otherwise, each feature disclosed represents one example of a generic series of equivalent or similar features.

Use of exemplary language, such as "for instance", "such as", "for example" and the like, is merely intended to better illustrate the invention and does not indicate a limitation on the scope of the invention unless so claimed. Any steps described in the specification may be performed in any order or simultaneously, unless the context clearly indicates otherwise.

All of the features and/or steps disclosed in the specification can be combined in any combination, except for combinations where at least some of the features and/or steps are mutually exclusive. In particular, preferred features of the invention are applicable to all aspects of the invention and may be used in any combination.

We claim:

1. A method of calibrating at least one camera, the method comprising:
   (a) capturing at least one image of at least one array pattern, said at least one image comprising a plurality of interest points, with at least one pose of each at least one camera;
   (b) processing said at least one image to determine a provisional position of at least one interest point on the at least one image;
   (c) refining the provisional position of said at least one interest point on the at least one image by:
      (i) selecting a partial area of the at least one image that includes at least one interest point and at least a portion of at least two edges that meet at or near the interest point,
      (ii) defining at least a first set of edge points and a second set of edge points representative of said at least two edges;
      (iii) applying regression analysis to the first set of edge points and the second set of edge points, respectively;
      (iv) determining a refined position of the at least one interest point as an intersection of regression functions representative of the first of edge points and the second set of edge points; and
   (d) optimizing camera calibration parameters based on the refined position of the at least one interest point on the at least one image,
   wherein the optimizing comprises estimating parameter values that describe at least one or a combination of:
   poses of the at least one array pattern; and/or
   poses of the at least one camera; and/or
   camera properties for each of the at least one camera, preferably at least optical center, focal length and distortion parameters of each of the at least one camera, and
   wherein the optimizing comprises estimating and simultaneously optimizing parameter values that describe at least:
   mobile robot poses during the capturing of images; and/or
   poses of the at least one array pattern; and/or
   poses of the at least one camera; and/or
   camera properties for each of the at least one camera, preferably at least optical center, focal length and distortion parameters of each of the at least one camera.

2. The method of claim 1, wherein the at least first and second set of edge points are defined by:
   (l) applying an edge detection algorithm to image data in a region of interest to generate a set of edge points that includes the at least two intersecting edges;
   (m) defining at least two lines that intersect at the provisional interest point; and
   (n) categorizing the set of edge points into at least a first and a second set of edge points based on a distance of the edge points within each set to each of the lines, such that the edge points within a first set are closer to one of the lines than to any other line defined in (b).

3. The method of claim 1, wherein the at least one camera comprises at least two cameras that are fixedly arranged on a mobile robot and wherein the at least two cameras comprise at least one pair of stereo cameras and wherein the method further comprises refining a stereo calibration of the at least one pair of stereo cameras upon completion of the optimizing.

4. The method of claim 1, wherein the at least one array pattern comprises a plurality of squares, and wherein the interest point is a corner at a meeting point of four squares on the at least one array pattern.

5. The method of claim 1, wherein the at least one array pattern comprises a plurality of squares having identical dimensions and that are arranged in adjacent positions such that at least two sides of each square meets a side of an adjacent square, each square having a uniform color, and wherein the at least one array pattern comprises squares having two or more colors.

6. The method of claim 1, wherein prior to the optimizing, a refined position of each interest point is uniquely assigned based on a color pattern in the at least one array pattern.

7. The method of claim 1, wherein regression analysis comprises performing linear regression of edge points representative of the predicted edges, and wherein a refined position of each interest point is determined as the intersection of lines obtained by the linear regression analysis of the edge points.

8. An image capture system comprising:
(a) at least one land-based mobile robot;
(b) at least two cameras that are fixedly mounted on each said at least one mobile robot;
(c) a processing module, adapted to:
  (i) receive and store image data, obtained by the at least two cameras, of at least one array pattern that comprises a plurality of interest points;
  (ii) process said image data to determine a provisional position of the interest points on each captured image;
  (iii) refine the provisional position of the interest points by regression analysis of data points representative of at least two edges that meet at or near the interest points, the refined position being determined as an intersection of regression curves thereby obtained; and
  (iv) optimize camera calibration parameters based on the refined position of the interest points,
wherein optimizing in (iv) comprises estimating parameter values that describe at least one or a combination of:
poses of the at least one array pattern; and/or
poses of the at least two cameras; and/or
camera properties for each of the at least two cameras, preferably at least optical center, focal length and distortion parameters of each of the at least two cameras, and
wherein the optimizing comprises estimating and simultaneously optimizing parameter values that describe at least:
mobile robot poses during capturing of images; and/or
poses of the at least one array pattern; and/or
poses of the at least two cameras; and/or
camera properties for each of the at least two cameras, preferably at least optical center, focal length and distortion parameters of each of the at least two cameras.

9. The image capture system of claim 8, wherein the mobile robot further comprises a communication module and wherein the processing module is on a server that is in communication with the land-based mobile robot via the communication module.

10. The image capture system of claim 8, wherein the land-based mobile robot is an autonomous or semi-autonomous robot.

11. A method of detecting interest points on an image of an array pattern, the method comprising:
(a) capturing at least one image of an array pattern comprising a plurality of interest points with at least one camera;
(b) processing said at least one image to determine a provisional position of at least one interest point on the at least one image; and
(c) refining the provisional position of said at least one interest point on the at least one image by:
  (i) selecting a partial area of the image that includes at least one interest point and at least a portion of at least two edges that meet at or near the provisional position of the interest point,
  (ii) defining at least a first set of edge points and second set of edge points representative of said at least two edges;
  (iii) applying regression analysis to the first set of edge points and the second set of edge points, respectively; and
  (iv) determining a refined position of the at least one interest point as an intersection of regression functions representative of the first set of edge points and the second set of edge points,
wherein the array pattern comprises rectangles or squares that are arranged so as to minimize a number of corners at a meeting point of multiple rectangles or squares having an identical color arrangement about a corner, and so that the color arrangement of the rectangles or squares around each corner in the pattern is unique within the pattern.

12. The method of claim 11, wherein the array pattern comprises a plurality of squares, and wherein the interest point is a corner at a meeting point of four squares on the array pattern.

13. The method of claim 11, wherein the provisional position is determined by analysis of derivative of signal intensities in at least a portion of the image.

14. The method of claim 11, wherein the array pattern comprises a plurality of rectangles or squares having identical dimensions and that are arranged in adjacent positions such that at least two sides of each rectangle or square meets a side of an adjacent square, each square having a uniform color, and wherein the array pattern comprises rectangles or squares having two or more colors.

15. A method of calibration of at least one camera, the method comprising:
(a) providing a mobile robot comprising a plurality of cameras that are fixedly mounted thereon;
(b) providing at least two geometrically fixed array patterns, each pattern comprising a plurality of interest points;
(c) capturing a plurality of images of at least a portion of said array patterns using said plurality of cameras for a plurality of poses of the mobile robot;
(d) determining the position of a plurality of interest points within each of the array patterns for images captured in (c), so as to generate a grid of interest points within each array pattern for different poses of the mobile robot; and
(e) process image information from (d) to simultaneously optimize at least one of:
  (i) position of said plurality of cameras; and/or (ii) optical center of each of said plurality of cameras; and/or (iii) focal length of each of said plurality of cameras, wherein prior to the optimizing, a refined position of each interest point is uniquely assigned based on a color pattern in the array.

16. The method of claim 15, wherein the optimizing comprises estimating parameter values that describe at least one of:

(i) mobile robot poses during the capturing of images;
(ii) poses of the array patterns;
(iii) poses of the plurality of cameras; and
(iv) camera properties for each of the plurality of cameras, preferably at least optical center, focal length and distortion parameters of each of the at least one camera.

17. The method of claim 15, wherein determination of the position of the interest point on an image is carried out by:

processing an image to determine a provisional position of at least one interest point on the image;
refining the provisional position of said at least one interest point the images by:
(i) selecting a partial area of the image that surrounds the at least one interest point and includes at least a portion of at least two edges that meet at the interest point,
(ii) defining at least a first set of edge points and a second set of edge points representative of said at least two intersecting edges;
(iii) applying regression analysis to the first set of edge points and the second set of edge points, respectively; and
(iv) determining a refined position of the at least one interest point as an intersection of regression functions representative of the first set of edge points and the second set of edge points.

18. The method of claim 17, wherein the at least first and second set of edge points are defined by:

(l) applying an edge detection algorithm to image data in a region of interest to generate a set of edge points that includes the at least two intersecting edges;
(m) defining at least two lines that intersect at the provisional interest point; and
(n) categorizing the set of edge points into at least a first and a second set of edge points based on a geometric distance of the edge points within each set to each of the lines, such that the edge points within a first set are closer to one of the lines than to any other line defined in (b).

19. The method of claim 15, wherein an initial position of the interest point is determined by analysis of derivative of signal intensities in at least a portion of at least one image.

20. The method of claim 15, wherein regression analysis comprises performing linear regression of edge points representative of the predicted edges, and wherein a refined position of each interest point is determined as an intersection of lines obtained by the linear regression analysis of the edge points.

* * * * *